(12) United States Patent
Miao

(10) Patent No.: US 7,002,470 B1
(45) Date of Patent: Feb. 21, 2006

(54) WIRELESS UWB-BASED SPACE-TIME SENSOR NETWORKS COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 142 days.

(21) Appl. No.: 10/837,809

(22) Filed: May 3, 2004

(51) Int. Cl.
*G08B 1/08* (2006.01)
*H04Q 7/00* (2006.01)

(52) U.S. Cl. .............................. 340/539.22; 340/539.1; 342/463

(58) Field of Classification Search ........... 340/539.22, 340/539.1, 552, 815.4; 342/463, 464
See application file for complete search history.

(56) References Cited

U.S. PATENT DOCUMENTS

| | | | | |
|---|---|---|---|---|
| 5,796,363 A | * | 8/1998 | Mast | 342/22 |
| 5,933,079 A | * | 8/1999 | Frink | 340/572.4 |
| 6,054,950 A | * | 4/2000 | Fontana | 342/463 |
| 6,483,461 B1 | * | 11/2002 | Matheney et al. | 342/463 |
| 6,492,904 B1 | * | 12/2002 | Richards | 340/539.1 |
| 6,497,656 B1 | * | 12/2002 | Evans et al. | 600/300 |
| 6,518,915 B1 | * | 2/2003 | Schutz et al. | 342/28 |

* cited by examiner

Primary Examiner—John Tweel, Jr.

(57) ABSTRACT

This invention presents a wireless UWB-based space-time networks communication that is used to utilize a larger number of sensor nodes in commercial, potentially hostile, and militarily sensitive environments. The sensor networks communications contain N wireless UWB-based space-time sensor nodes, M sensor node forward stations and a sensor basestation. Each of wireless UWB-based space-time sensor nodes is to support data collection with a multimode sensing, signal processing and analysis, and transmission fashion by using an UWB pulse modulation with a multiple antenna. The sensor node forward stations have a dual-mode transmitting function based MIMO space-time and UWB approaches along with a spread spectrum technology. The sensor basestation also uses a space-time approach with MIMO sensor-antenna architecture. Thus, the wireless UWB-based sensor networks communications simultaneously exploit temporal and spatial diversity for sensor networks communications, thereby converting spatially distributed UWB-based sensor nodes into efficient, robust, reliable, and secure wireless sensor communications.

23 Claims, 9 Drawing Sheets

WIRELESS UWB-BASED SPACE-TIME SENSOR NETWORKS COMMUNICATIONS

BACKGROUND

This invention is generally relative to a wireless Ultra Wideband (UWB)-based space-time sensor networks communication.

In order to collect data of interest, sensor networks communications often scatter multiple sensor nodes over a limited geographic region. The collected data is then analyzed to expeditiously achieve or facilitate a given mission objective. It does not matter whether the collected data is continued surveillance, reconnaissance, target identification, registration and disposition, or anything else along those lines. Each of the sensor nodes in the sensor networks communications is expected to reliably and securely transmit its data to a receiver for further analysis, pattern recognition, coordination, and processing during various time intervals. Different sensor nodes in the sensor networks communications may be responsible for different levels of throughput and fidelity depending on a particular task. In some cases, some of sensor nodes in the sensor networks communications may have to provide several transmissions within a short-time interval while other sensor nodes may only transmit at irregular intervals or even not at all. Thus, resource allocations of the sensor networks communications need be determined and continually reassessed so that accommodations of such versatility can be achieved in performance.

In the next generation, further sensor networks communications are envisioned to contain a large number of sensor nodes. Each of the sensor nodes has a limited capability in terms of computation, communication and sensing capabilities, and operates in an unattended mode with limited energy. The sensor nodes in the further sensor networks communications are characterized by severe energy constraints because sensor nodes have to operate with finite battery resources. Generally speaking, the further sensor networks communications have several properties as follows: (1) Sensor networks communications is composed of a large number of sensor nodes that are densely deployed either inside the phenomenon or very close to it; (2) Sensor nodes are prone to failures; (3) A topology of the sensor networks communications changes very frequently with times; (4) Sensor nodes usually use a broadcast communication paradigm; (5) Sensor nodes have limited power, computational capacities, signal processing, transmit, and memory; and (6) in some cases, sensor nodes may not have global identification because the sensor networks communications use a larger amount of overhead and large number of sensor nodes.

The sensor networks communications has many applications either in commercial business or in military environments. One is used to monitor and control the safety critical military and governmental environmental such as domestic infrastructure systems. In this case, the application of the sensor networks communications may include battlefield detection and protection systems for biological, chemical and/or radiological weapons, aiding areas hit by disasters. Another application is used for homeland security at airports, bridges, public building, and major subway train systems. A third application is used for tracking. For example, a ship in the ocean emits sounds that may be detected and characterized by several underwater sensor networks. As the ship moves, the bearing measurements slowly change. A fourth application is in smart spaces that may include semiconductor and/or manufactory facilities, smart building, cities, and even sensitive laboratories. A fifth application is used to monitor ground temperature such as a forest to detect fast moving forest fires. A sixth application is in entertainment environment including amusement parks and/or museums. In addition, other applications are in health care systems such as higher-age health monitor and/or patient health and movement status in hospital or at home environment. Hence, the sensor networks communications has tremendous application value not only in military battlefield but also in commercialization.

Recent advances in integrated circuits technology have enabled mass production of tiny, cost-effective, and energy-efficient seamless sensor nodes with processing capabilities. A seamless sensor node is usually equipped with a sensor module which detects via electrical/electromagnetic fields, acoustics, optical, movement, chemicals, biological agents, radiation, environmental factors such as humidity, temperature, etc. Characteristics of seamless sensor nodes to be considered are size, battery consumption, energy level, lifetime, movement (whether the sensor is mobile or must remain stationary), position (whether the sensor node may be embedded or may be independent of its surroundings), redundancy for checking integrity, and failure modes. The malfunctions may indicate that the sensor node has failed, is degrading slowly, or possesses Byzantine behavior such as going up and down randomly.

Advanced sensor networks communications is expected to deploy a larger number of size sensor nodes, such as 1000, or even more individual sensor nodes in potentially hostile and militarily sensitive environments. Sensor nodes can be either thrown in as a mass or placed one-node by one-node in the sensor field. In particular, the sensor nodes can be deployed by using several methods: (1) dropping from an air plane, such as an unmanned plane; (2) delivering in an artillery shell, missile or rocket; and (3) placing a sensor node either by a human or a robot, etc. Furthermore, additional sensor nodes can be redeployed to replace malfunctioning nodes because of changes in task dynamics at any time.

Each of the sensor nodes in the sensor network communications is likely to support data collection and transmission in an efficient, robust, reliable, and secure communication fashion. However, the sensor network communications will encounter multipath propagation because the sensor network elements are not likely to be guaranteed a line-of-sight transmission path to the receiver, which is usually not promised to remain at a fixed position for any period of time. Thus, the received signal from the sensor nodes is much weaker than the transmitted signal due to mean propagation loss. In addition to mean path loss, the received signal exhibits fluctuations in signal level because of fading. Moreover, the sensor networks communications may likely be jam resistant in a hostile and militarily sensitive or a battlefield. In most situations, battery recharging for the sensor nodes is impossible. Therefore, to effectively operate under the abovementioned constraints, we invent the use of UWB technologies along with MIMO-based space-time processing architecture for the sensor networks communications.

U.S. Federal Communications Commission (FCC) released the revision of Part 15 of the Commission's rules regarding UWB transmission systems to permit the marketing and operation of new products incorporating UWB technology On Apr. 22, 2002. With appropriate technology, UWB-based sensor nodes can operate using spectrum occupied by existing radio service without causing interference, thereby permitting scare spectrum resources to be used more efficiently. UWB technology that uses baseband pulse has recently drawn interest for wireless sensor network communications. The UWB technology requires no radio carrier frequencies because of employing baseband transmission. Thus, the UWB technology is resilient to multipath and jam interference. In addition, low transmission power and simple transceiver circuitry make UWB an attractive technology for wireless sensor networks communications.

The present invention of the wireless UWB-based space-time sensor networks communications has not only full capability for sensing data, source data encryption, computing and transmission as well as strategies that overcome signal multipath propagation effects, but also has an architecture scheme for a tiny, low-power, low-cost communication transceiver, sensing, and computing processing units in the sensor node. Thus, there is a continuing need of the wireless UWB-based space-time sensor networks communications.

SUMMARY

In accordance with one aspect, a wireless UWB-based space-time sensor networks communications comprises N UWB transceiver-based sensor nodes, M UWB and multi-input/multi-output MIMO transceiver-based sensor forward stations, a MIMO-based space-time sensor basestation transceiver with a multiple antenna.

Other aspects are set forth in the accompanying detailed description and claims.

DETAILED DESCRIPTION

Some embodiments described herein are directed to wireless UWB-based space-time sensor networks communications. The sensor networks communications may be implemented in hardware, such as in an Application Specific Integrated Circuits (ASIC), digital signal processor, field programmable gate array (FPGA), software, or a combination of hardware and software, as well as other materials.

UWB-Based Space-Time Sensor Networks Communications System

Figure 1:
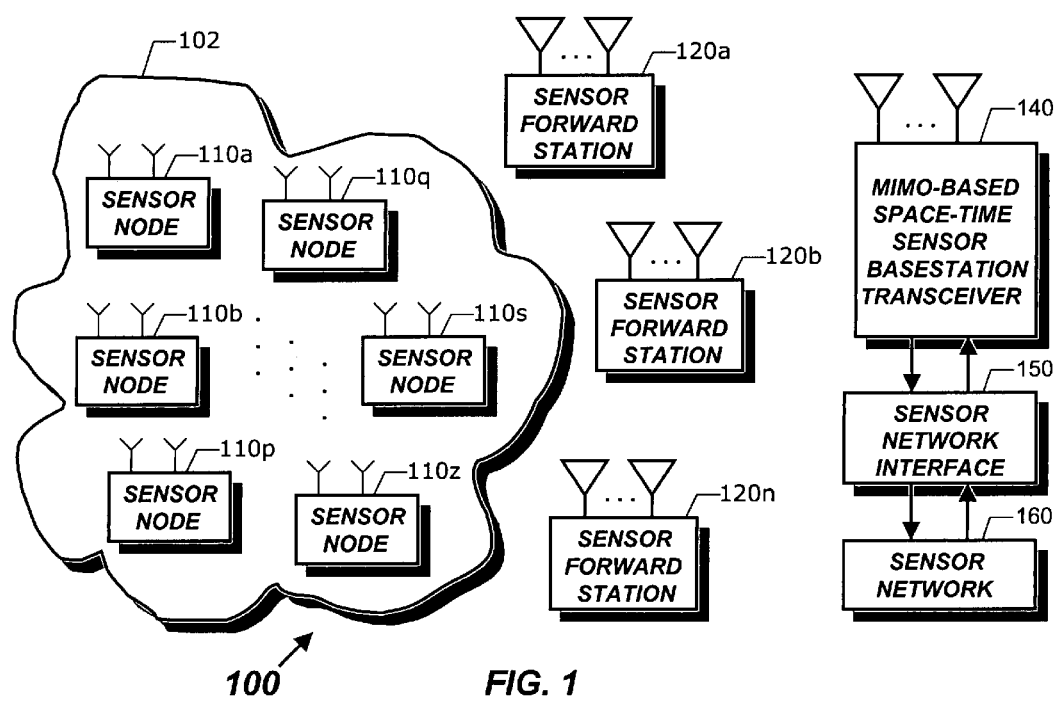
FIG. 1 is a block diagram of showing a wireless UWB-based space-time sensor networks communications system according to some embodiments.

A wireless UWB-based space-time sensor networks communications system 100 is shown in FIG. 1 in accordance with one embodiment of the present invention. A number of N UWB-based space-time sensor nodes from 110a to 110z are deployed in a sensor field 102. These UWB-based space-time sensor nodes from 110a to 110z can simultaneously communicate with each other by broadcasting and with a number of M UWB-based MIMO sensor node forward stations from 120a to 120n, which can self communicate with each other as well. Each of the M UWB-based MIMO sensor node forward stations from 120a to 120n can communicate with a MIMO-based space-time sensor basestation transceiver 140 that is connected to a sensor network interface 150 coupled to a sensor network 160 for processing data information.

The UWB-based space-time sensor nodes use a sequence of shaped baseband pulses to transmit the information data to the UWB-based MIMO sensor node forward stations based on one of modulation technologies: pulse position modulation (PPM), time-hopping PPM, biphase modulation (BPM), hybrid modulation (HM) that is a combination of PPM and BPM, on-off keying (OOK), and chaotic PPM. The chaotic PPM is that inter pulse time interval controlled by using a chaotic map.

The MIMO-based space-time sensor basestation transceiver 140 can transmit and receive all of information data from all of the M UWB-based MIMO sensor node forward station from 120a to 120n by spreading and despreading of the forward sensor station's pseudorandom sequences, with prior knowing all of pseudorandom sequences of the UWB-based MIMO sensor node forward stations. In a similar way, each of the UWB-based MIMO sensor node forward stations from 120a to 120n also knows all of the UWB-based space-time sensor nodes within a clustering group so that a communication can be established in a secure way of wireless communication.

A multiple antenna unit is employed with all of the UWB-based space-time sensor nodes from 110a to 110z, the UWB-based MIMO sensor forward stations from 120a to 120n, and the MIMO-based space-time sensor basestation transceiver 140. Because multiple antennas are used, the wireless UWB-based space-time sensor networks communications system 100 is able to transmit the data rate with an enhancement in a longer distance range. Moreover, the wireless UWB-based space-time sensor networks communications system 100 can simultaneously exploit temporal and spatial diversity for wireless UWB-based space-time sensor networks communications, thereby enabling spatially distributed sensor nodes into efficient, robust, reliable, and secure wireless sensor networks communications.

Different UWB-based space-time sensor nodes in the sensor field 102 may be responsible for different levels of throughput and fidelity depending on a particular assigned task. In some cases, some UWB-based space-time sensor nodes may have to provide several transmissions within a short-time interval while other wireless sensor nodes may only transmit at irregular intervals or even not at all. Thus, the wireless UWB-based space-time sensor networks communications 100 as shown in FIG. 1 is also used to determine and continually reassess resource allocations so that accommodations of such versatility can be achieved in performance for wireless seamless sensor networks communications.

The present invention of the wireless UWB-based space-time sensor networks communications system 100 simultaneously utilizes multiple antennas on both transmitter and receivers by processing signal samples both in space and time. The UWB technology is used so that the sensor networks communication system 102 is resilient to multi-path and jam interference. Also, the UWB technology enables the transmitter receiver architecture in the sensor node system and in the sensor node forward station system to be made on a simple circuit with a lower transmission power. This is because of using baseband shaped pulses in the transmitter. In the UWB-based space-time sensor receiver, space-time processing can increase array gain, spatial and temporal diversity and reduce CCI and ISI. In a UWB-based space-time sensor transmitter, the spatial dimension can enhance array gain, improve diversity, and reduce generation of CCI and ISI. Thus, the present invention of the wireless UWB-based space-time sensor network communications system 100 mainly tends to use temporal signal processing. This is because use of the spatial-temporal signal processing can improve average signal power, mitigate fading, and reduce CCI and ISI, thereby significantly improving the capacity, coverage, and quality of wireless seamless sensor networks communications. In addition, dual-transmit diversity can boost the data rate not only on uplink channel but also on downlink channel, which allows the sensor forward station to control sensor nodes.

The main task of the wireless UWB-based space-time sensor networks communication system 100 is used to detect events, perform quick local data processing, and then transmit the information data over wireless MIMO-based space-time communication channels for further studies.

UWB-Based Space-Time Sensor Node Architecture

Figure 2:
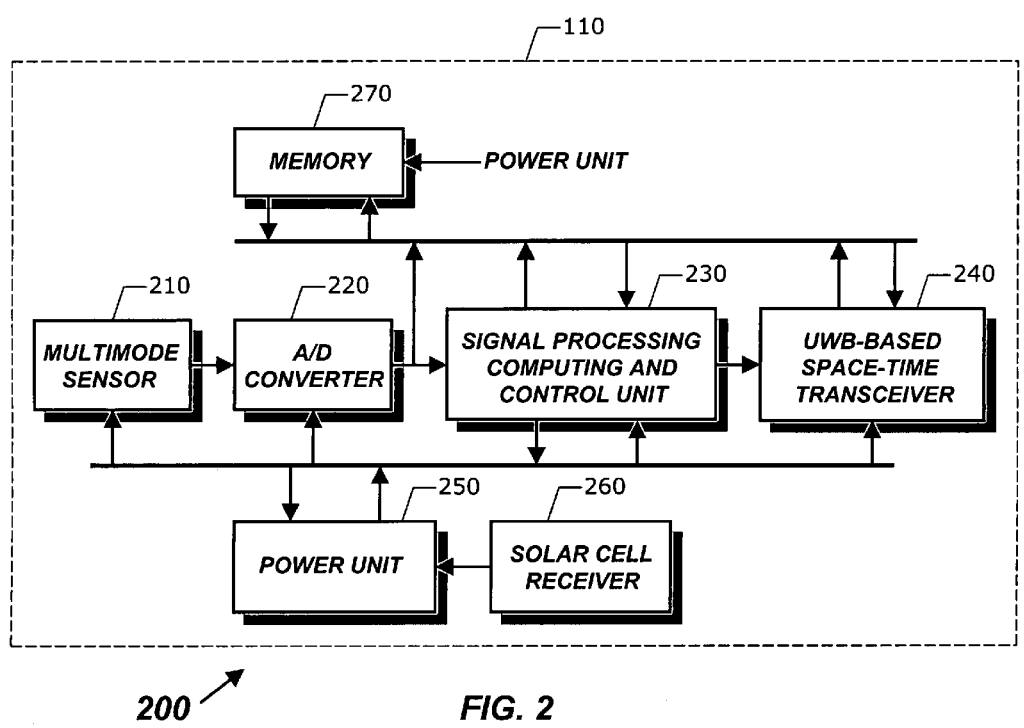
FIG. 2 is a block diagram of showing a wireless UWB-based space-time sensor node architecture according to some embodiments.

FIG. 2 is a block diagram 200 of showing the UWB-based space-time sensor node architecture 110 according to some embodiments. The UWB-based space-time sensor node architecture 110 includes a multimode sensor 210, an A/D converter 220, a signal processing, computing and control unit 230, UWB-based space-time transceiver 240, a power unit 250 coupled with a solar cell receiver 260, and a memory 270. The multimode sensor 210 can be used to sensor different input signals based on an observation phenomenon. The multimode sensor 210 can be one of electronic, optical, chemical, nuclear fusion, gas/liquid, or any combination sensing made by using properties of integrated electrical, optical, piezoelectric, and even chemical materials, and so on. The multimode sensor 210 is coupled to the A/D converter 220. The A/D converter 220 converts the input analog signals into digital signals and then feed into the signal processing, computing and control unit 230. The A/D converter 220 is also connected to the memory 270, which serves as a pool memory storage in the UWB-based space-time sensor node architecture. The signal processing, computing and control unit 230, which is coupled to the memory 270 and the UWB-based space-time transceiver 240, manages the procedures that make the sensor node to collaborate with the other sensor nodes and move sensor node with the knowledge of location in a high accuracy when it is required to carry out the assigned sensing tasks. The signal processing, computing and control unit 230 can also be used to perform for a data link layer, a network layer, a transport layer, and an application layer as well as for a power management plane, mobility management plane and task management plane. In addition, the signal processing, computing and control unit 230 carries out the simple signal processing based on the collected data to provide surveillance, reconnaissance, target identification, registration and disposition, or anything else along those lines and then passes the useful data information into the UWB-based space-time transceiver 240. That is, instead of sending all the raw data to the sensor node forward station 120 (see in FIG. 1), the signal processing, computing and control unit 230 uses its processing abilities to locally carry out simple computations and provides only the required and partially processed data for transmitting. The UWB-based space-time transceiver 240 is expected to reliably and securely transmit its data to the sensor node forward station 120 for further analysis, pattern recognition, coordination, and processing during various time intervals. The entire UWB-based space-time sensor node architecture 110 is supported by the power unit 250, which is coupled to the solar cell receiver 260. The power unit 250 is needed to support three major domains including sensing, signal and data processing, and communication.

Figure 3:
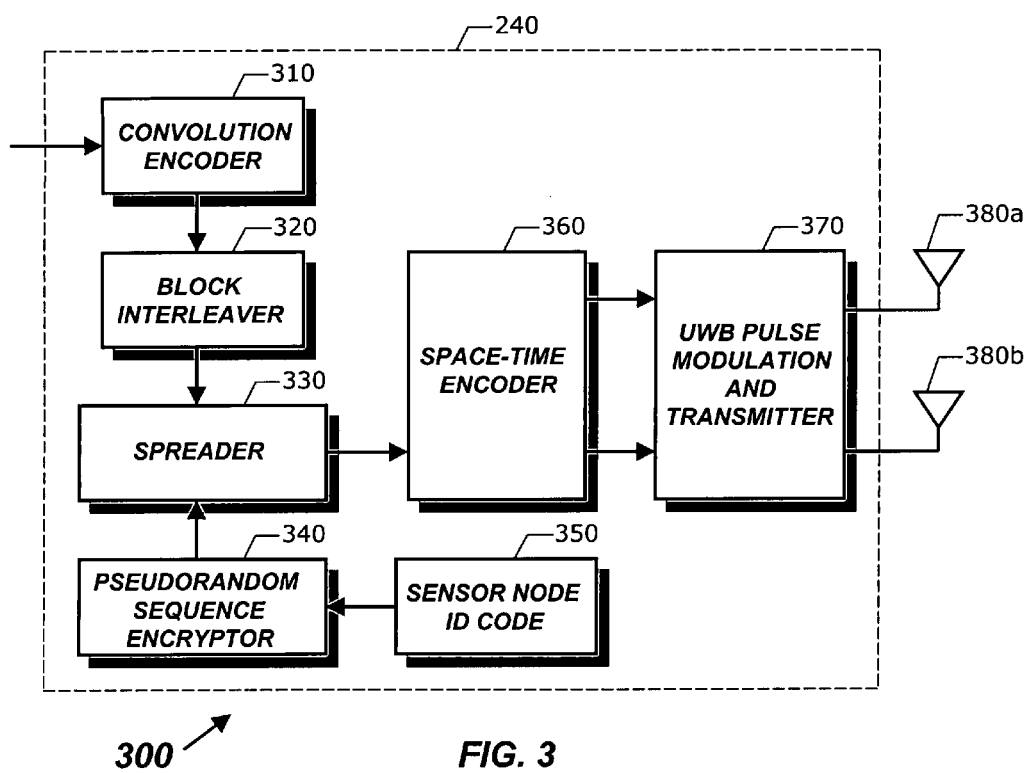
FIG. 3 is a block diagram of showing a UWB-based space-time transceiver of the sensor node according to some embodiments.

Referring to FIG. 3 is a detailed block diagram 300 of showing the UWB-based space-time transceiver 240 according to some embodiments. An input sensing sequence stream is fed into a convolution encoder 310 coupled to a block interleaver 320. The convolution encoder 310 is used to encode the input sensor information data. The output of the convolution encoder 310 is interleaved by using the block interleaver 320. The output data of the block interleaver 320 is then fed into a spreader 330. Using the output of the block interleaver 320 with a long pseudorandom sequence, which is generated by using a pseudorandom sequence encryptor 340, uses the spreader 330 to perform as a scrambler. A sensor node identification (ID) code 350 is coupled to the pseudorandom sequence encryptor 340. The sensor node ID code 350 produces a unique sensor mask sequence for the pseudorandom sequence encryptor 340. As a result, the long pseudorandom sequence that is generated by the pseudorandom sequence encryptor 340 is also a unique sequence for the sensor node. In other words, a self-correlation of the long pseudorandom sequence is proximately equal to 1 while as a correlation between the long pseudorandom sequences with other long pseudorandom sequences of other sensor nodes is almost equal to 0.

Figure 4:
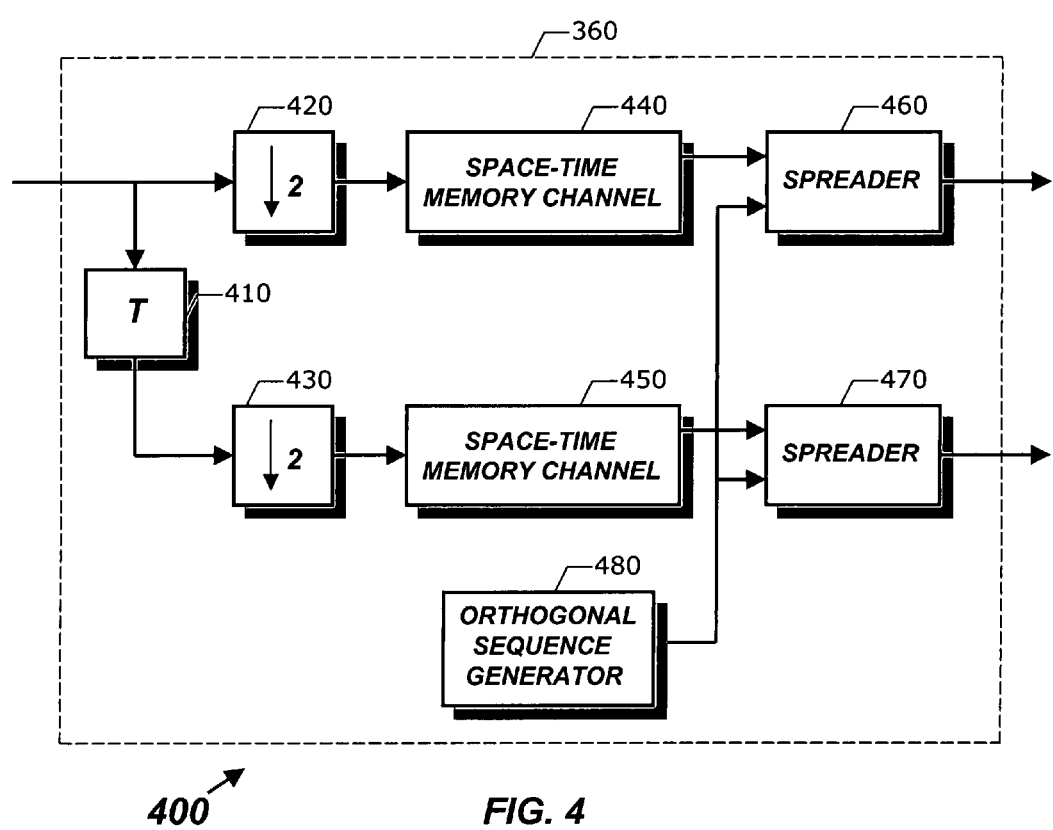
FIG. 4 is a block diagram of showing a space-time encoder of the UWB-based space-time transceiver in the sensor node according to some embodiments.

Referring to FIG. 4 is a detailed block diagram 400 of showing the space-time encoder 360 of the UWB-based space-time transceiver according to some embodiments. An input signal passes a downsampling 420 that is coupled to a space-time memory channel 440. At the same time instant, the input signal first is delayed by a chip-time-instant and then passes a downsampling 430, which is coupled to a space-time memory channel 450. If the length of the input signal sequence is 2L with a 2M Megachips/second Mcps, then the output lengths of the downsamplings 420 and 430 are equal to L with an M Mcps. Both of the space-time memory channels 440 and 450 have a size of L in memory. The chip rates of the data in each output of the space-time memory channels 440 and 450 are also M Mcps. The space-time memory channels 440 and 450 are coupled to two spreaders 460 and 470 in parallel. The two spreaders 460 and 470 are used to spread the output sequences of the space-time memory channels 440 and 450 with two orthogonal sequences generated by an orthogonal sequence generator 480. The each of two orthogonal sequences has 2M Mcps in chip rate. Thus, the output sequences of the two spreaders 460 and 470 have the chip date at 2M Mcps. In addition, the output sequences of the two spreaders 460 and 470 are also orthogonal to each other since the output sequences from the orthogonal sequence generator 480 are all orthogonal each to other.

Figure 5:
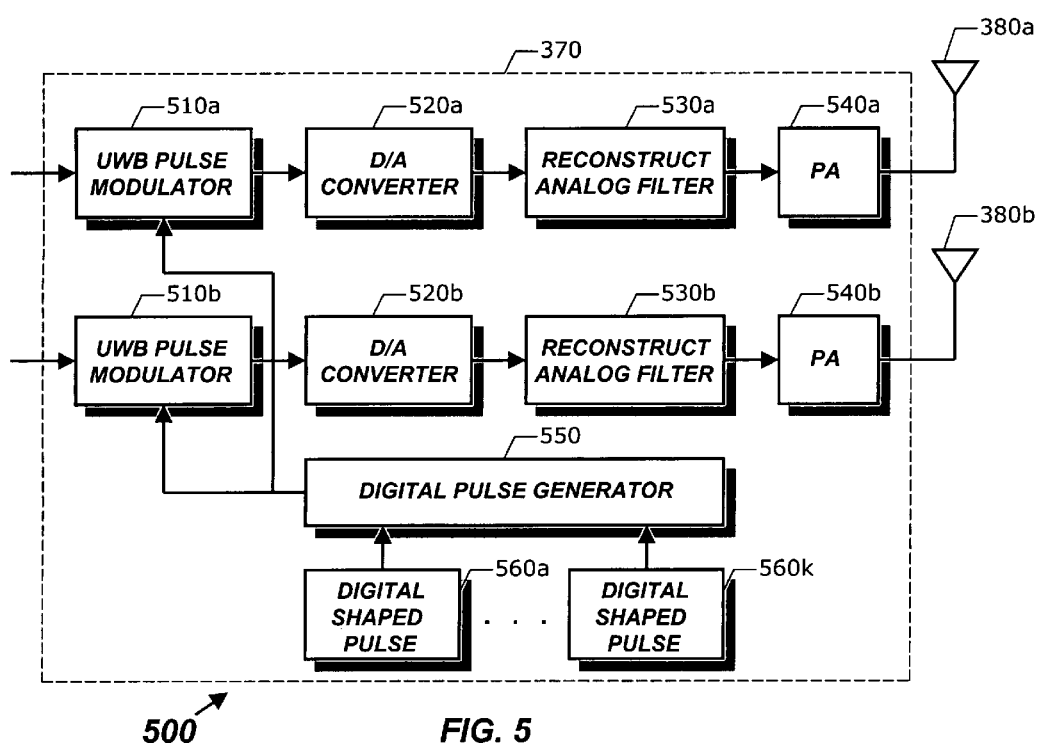
FIG. 5 is a block diagram of showing a UWB pulse modulation and transmitter of the UWB-based space-time transceiver in the sensor node according to some embodiments.

Referring to FIG. 5 is a detailed block diagram 500 of showing the UWB pulse modulator and transmitter 370 of the UWB-based space-time transceiver according to some embodiments. Two input signals are in parallel passed into UWB pulse modulators 510*a* and 510*b*. The UWB pulse modulators 510*a* and 510*b* may be one of the modulation technologies: PPM, time-hopping PPM, biphase BPM, HM, OOK, and chaotic PPM. The UWB pulse modulators 510*a* and 510*b* are coupled to a D/A converter 520*a* and a D/A converter 520*b*, respectively, and also are connected with a digital pulse generator 550. The D/A converters 520*a* and 520*b* are respectively connected with a reconstruct analog filter 530*a* and a reconstruct analog filter 530*b*. The digital pulse generator 550 is coupled to several digital shaped pulses from 560*a* to 560*k*. Each of the digital shaped pulses from 560*a* to 560*k* includes a unique shaped digital monocycle pulse that can meet FCC's restriction in the frequency-domain. Then the UWB pulse modulator 510*a* and 510*b* pass the different shaped digital monocycle pulses based on two input chip sequences with modulation technology into the D/A converters 520*a* and 520*b* followed by reconstruct analog filters 530*a* and 530*b* to form analog shaped monocycle pulses. The analog shaped monocycle pulses from the output of reconstruct analog filters 530*a* and 530*b* are amplified by two power amplifiers 540*a* and 540*b*, respectively, through antennas 380*a* and 380*b* for transmitter.

Sensor Node Forward station Architecture

Figure 6:
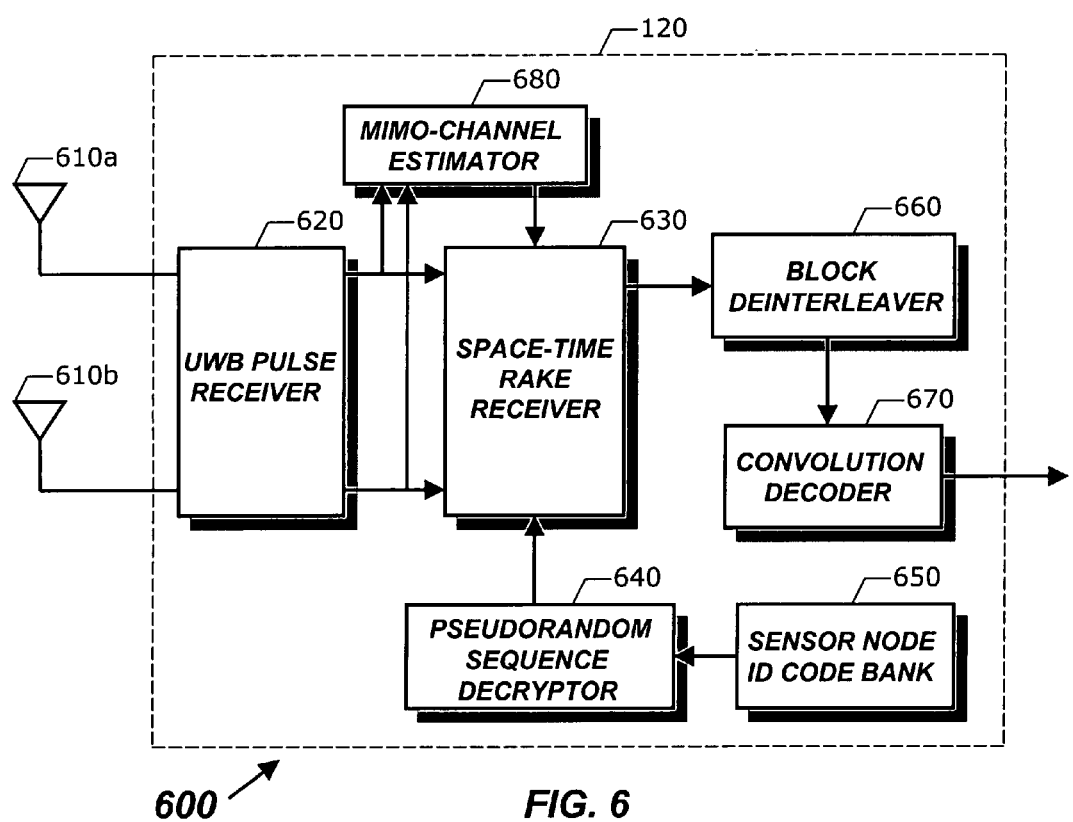
FIG. 6 is a block diagram of showing an UWB-based receiver in the sensor node forward station according to some embodiments.

FIG. 6 is a block diagram 600 of showing a sensor node forward station architecture 120 according to some embodiments. The sensor node forward station architecture 120 includes a multiple antenna 610*a* and 610*b*, an UWB pulse receiver 620, a space-time Rake receiver 630, a block deinterleaver 660, a convolution decoder 670, a pseudorandom sequence decryptor 640, a sensor node ID code bank 650, and a MIMO-channel estimator 680. The multiple antenna 610*a* and 610*b* receives transmitted sensor signals from the UWB-based space-time sensor node and passes it into the UWB pulse receiver 620 that is coupled to the space-time Rake receiver 630 and the MIMO-channel estimator 680. The MIMO-channel estimator 680 provides the MIMO-channel information for the space-time Rake receiver 630. The space-time Rake receiver 630 decodes the output sequences from the UWB pulse receiver 620 by using the unique pseudorandom sequence generated by the pseudorandom sequence decryptor 640. The pseudorandom sequence decryptor 640 is connected with sensor node ID code bank 650 that knows all the sensor node mask sequences within the cluster group. Thus, the output sequence of the space-time Rake receiver 630 is passed into the block deinterleaver 660 followed by the convolution decoder 670 for decoding the sensor node information data.

Figure 7:
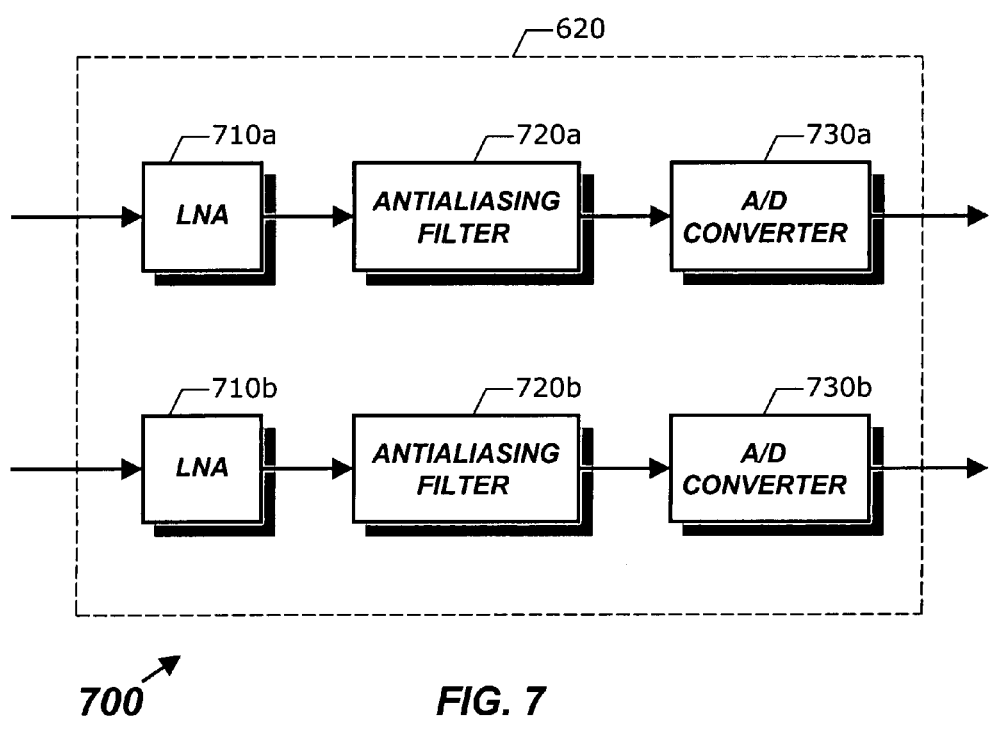
FIG. 7 is a block diagram of showing an UWB pulse receiver in the UWB-based receiver of the sensor node forward station according to some embodiments.

Referring to FIG. 7 is a detailed block diagram 700 of showing the UWB pulse receiver 620 of the sensor node forward station architecture according to some embodiments. The UWB pulse receiver 620 contains two similar channel receivers. The upper channel receiver includes a low noise amplifier (LNA) 710*a*, an anti-aliasing filter 720*a*, and an A/D converter 730*a*. The lower channel receiver also contains a LNA 710*b*, an anti-aliasing filter 720*b*, and an A/D converter 730*b*. The input radio signals are in parallel passed into the upper and lower channel receivers to produce two digital signal sequences for further signal processing. The A/D converters 730*a* and 730*b* are equivalent in function in terms of bit-resolution and sampling frequency rate.

Figure 8:
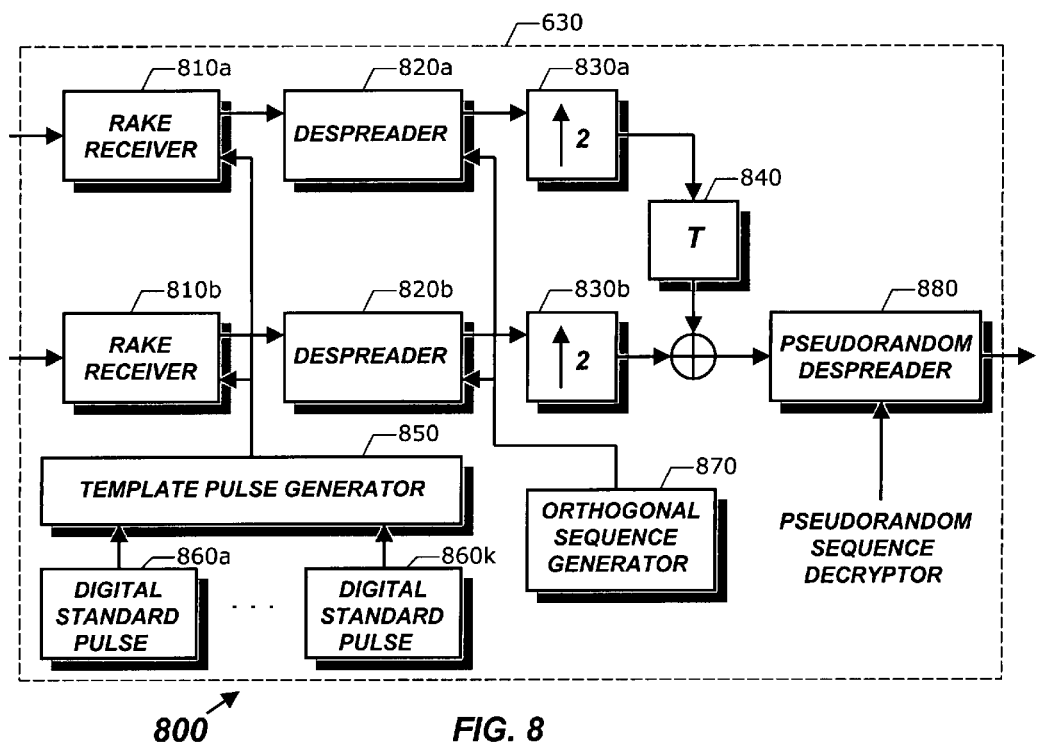
FIG. 8 is a block diagram of showing a space-time Rake receiver in the UWB-based receiver of the sensor node forward station according to some embodiments.

Referring to FIG. 8 is a detailed block diagram 800 of showing the space-time Rake receiver 630 of the sensor forward station architecture according to some embodiments. Two input digital signals are passed into two Rake receivers 810*a* and 810*b*, which are coupled to two despreaders 820*a* and 820*b*, respectively. A template pulse generator 850 that connects with several digital standard pulses from 860*a* to 860*k* is used to provide the digital standard pulses for the Rake receivers 810*a* and 810*b*. The Rake receivers 810*a* and 810*b* performs a correlation and a coherent combination based on the input digital signals and the digital standard pulses to produce two digital sequences for the despreaders 820*a* and 820*b*. The outputs of the Rake receivers 810*a* and 810*b* are in parallel despread with two orthogonal sequences generated from an orthogonal sequence generator 870 by using the despreaders 820*a* and 820*b*, respectively. The two despread sequences are then fed into two upsamplings 830*a* and 830*b*. The output sequence of the upsampling 830*a* is delayed by one chip time instant and then is added with the output sequence from the upsampling 830*b* together to form a combination upsampled output signal. The combination upsampled output signal is thus fed into a pseudorandom despreader 880 to provide the unscrambled digital signal sequence.

Clustering Operation for Sensor Nodes

Figure 9:
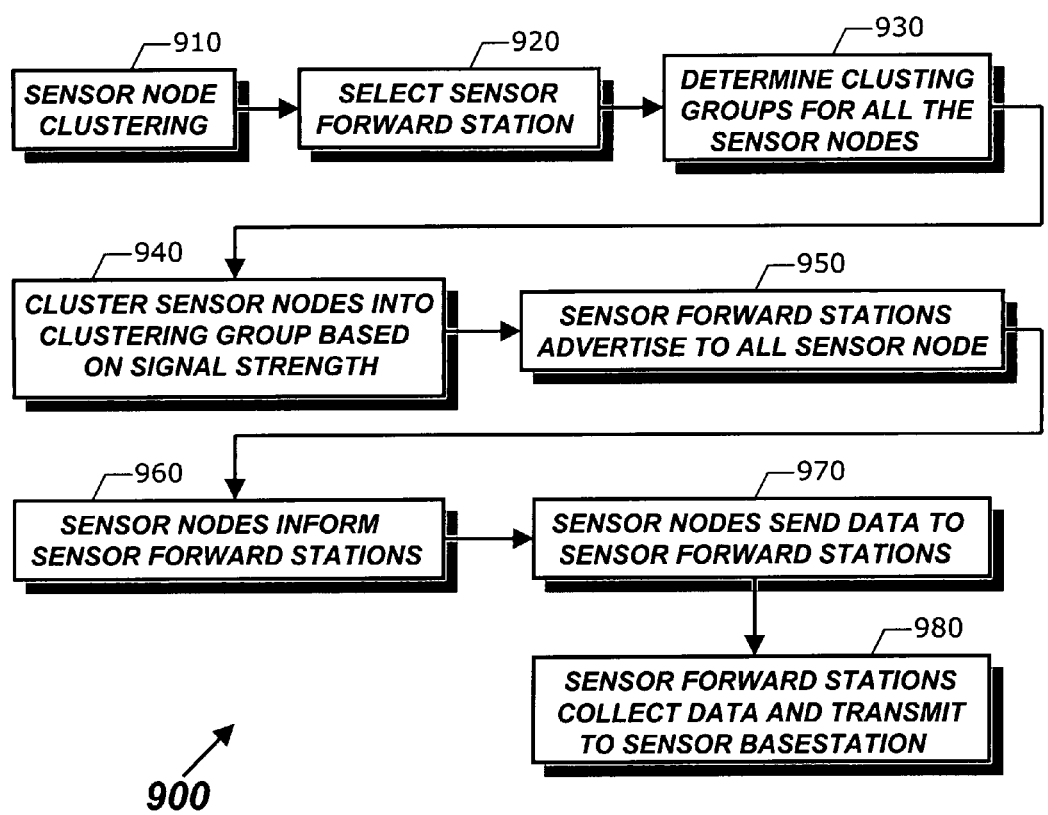
FIG. 9 is a flowchart diagram of showing a sensor node clustering procedure for the wireless UWB-based space-time sensor networks communications according to some embodiments.

FIG. 9 is a flowchart diagram 900 of showing a clustering operation for sensor nodes and sensor node forward stations in the sensor field according to some embodiments. The flowchart diagram 900 includes eight components: sensor node clustering 910; select sensor forward station 920; determine clustering group for all the sensor nodes 930; cluster sensor nodes into clustering group based on signal strength 940; sensor forward stations advertise to all sensor node 950; sensor nodes inform sensor node forward stations 960; sensor nodes send data to sensor node forward stations 970; and sensor node forward stations collect data and transmit the collected data to sensor basestation 980. The clustering operation of sensor nodes also has two phases including a setup phase and a steady phase.

During the setup phase, a sensor node clustering 910 selects the sensor node forward stations as sensor cluster heads. Each of the sensor cluster heads advertises to all sensor nodes in the sensor filed that it is the new sensor cluster head. The sensor nodes determine the cluster group to which they want to belong based on the signal strength of the advertisement from the sensor cluster heads to the sensor nodes after the sensor nodes receive the advertisements. Then the sensor nodes inform the one of appropriate sensor cluster heads, which then will be members in the clustering group. Thus, each of the sensor cluster heads receives all the sensor node ID mask codes within the cluster group and assigns a channel bandwidth that the sensor nodes can send data to the sensor cluster heads based on UWB approach.

During the steady phase, the sensor nodes begin sensing, performs simple signal processing, and start transmitting the processed data to the sensor cluster heads, which are sensor node forward stations. The sensor cluster heads also aggregate data from the sensor nodes within the clustering group and send these data to the sensor basestation. The entire wireless UWB-based space-time sensor node networks can go to the setup phase again to select other sensor cluster heads after the steady phase.

While the present inventions have been described with respect to a limited number of embodiments, those skilled in the art will appreciate numerous modifications and variations therefrom. It is intended that the appended claims cover all such modifications and variations as fall within the true spirit and scope of these present inventions.

What is claimed is:

1. A wireless UWB-based space-time sensor networks: communications comprising:
   N UWB transceiver-based sensor nodes;
   M UWB and MIMO transceiver-based sensor node forward stations, where M is less than N;
   a MIMO-based space-time sensor basestation transceiver with a multiple antenna;
   said MIMO-based space-time sensor basestation transceiver with a multiple antenna coupled to a sensor network interface; and
   said sensor network interface coupled to a sensor network.

2. The wireless UWB-based space-time sensor networks communications of claim 1 wherein each of the N UWB transceiver-based sensor nodes includes a multimode sensor, an A/D converter, a signal processing, computing and control unit, an UWB-based space-time transceiver, a memory, a power unit, and a solar cell receiver.

3. The wireless UWB-based space-time sensor networks communications of claim 2 wherein said multimode sensor is used to sensor any forms of input signals including electronic, optical, chemical, nuclear fusion, gas or liquid.

4. The wireless UWB-based space-time sensor networks communications of claim 2 wherein the UWB-based space-time transceiver further comprises a convolution encoder coupled to an interleaver, a spreader, a sensor node ID code coupled to a pseudorandom sequence encryptor, and said spreader coupled to a space-time encoder followed by an UWB modulation and transmitter.

5. The wireless UWB-based space-time sensor networks communications of claim 4 wherein the space-time encoder further includes a chip delay unit, two downsamplings, two space-time memory channels, two spreaders, and an orthogonal sequence generator.

6. The wireless UWB-based space-time sensor networks communications of claim 5 wherein said orthogonal sequence generator produces all digital sequences with orthogonal each other.

7. The wireless UWB-based space-time sensor networks communications of claim 4 wherein the UWB modulation and transmitter has two parallel branches connected with a digital pulse generator coupled to Q digital shaped pulses, where Q is an integer, each of said two parallel branches further includes an UWB pulse modulator coupled to a D/A converter that is connected with a reconstruct analog filter followed by a power amplifier (PA).

8. The wireless UWB-based space-time sensor networks communications of claim 7 wherein each of said Q digital shaped pulses contains a unique shaped digital monocycle pulse that can meet any spectrum restrictions in the frequency-domain.

9. The wireless UWB-based space-time sensor networks communications of claim 1 wherein each of the M UWB and MIMO transceiver-based sensor node forward stations comprises a UWB pulse receiver coupled to a space-time Rake receiver and a MIMO-channel estimator, said space-time Rake receiver coupled to a deinterleaver followed by a convolution decoder, and a pseudorandom sequence decryptor that is connected with a sensor node ID code bank coupled to said space-time Rake receiver.

10. The wireless UWB-based space-time sensor networks communications of claim 9 wherein the UWB pulse receiver further includes two branches; and each of said two branches comprising a LNA coupled to an anti-aliasing filter followed by an A/D converter.

11. The wireless UWB-based space-time sensor networks communications of claim 9 wherein the space-time Rake receiver further includes two Rake receivers, two despreaders, two upsamplings, a chip delay, a sum, a pseudorandom despreader, a template pulse generator, Q digital standard pulses, and an orthogonal sequence generator.

12. The wireless UWB-based space-time sensor networks communications of claim 11 wherein said two Rake receivers, which are connected with said template pulse generator followed by said N digital standard pulses, coupled to said two despreaders that are connected with said orthogonal sequence generator coupled to said two upsamplings; and one of said two upsamplings followed by said chip delay, and said chip delay and one of said two upsamplings coupled to said sum that is connected to said pseudorandom despreader.

13. A wireless sensor node comprising:
    a multimode sensor;
    an A/D converter;
    a signal processing, computing and control unit;
    an UWB-based space-time transceiver;
    a memory;
    a power unit;
    a solar cell receiver; and
    a multiple antenna array.

14. The wireless sensor node of claim 13 wherein said UWB-based space-time transceiver further includes a convolution encoder coupled to a block interleaver followed by a spreader, a sensor node ID code coupled to a pseudorandom sequence encryptor coupled to said spreader, and said spreader coupled to a space-time encoder that is connected with an UWB pulse modulation and transmitter.

15. The wireless sensor node of claim 14 wherein said UWB pulse modulation and transmitter further comprises two UWB pulse modulators coupled to two D/A converters, and said two D/A converters coupled to two reconstruct analog filters cascaded with two PA, and a digital pulse generator having Q digital shaped pulses coupled to said two UWB pulse modulators.

16. The wireless sensor node of claim 15 wherein each of said two UWB pulse modulators use one of modulations including PPM, time-hopping PPM, biphase BPM, HM, OOK, and chaotic PPM.

17. The wireless sensor node of claim 15 wherein each of said Q digital shaped pulses contains a unique and shaped digital monocycle pulse, wherein said unique and shaped digital monocycle pulse can meet any spectrum requirement in the frequency-domain.

18. The wireless sensor node of claim 13 wherein said UWB-based space-time transceiver transmits and receives a sequence of shaped monocycle pulses.

19. An article comprising a medium for storing programmable instructions that cause a processor-based system to:
    start a clustering approach for wireless UWB-based space-time sensor nodes;
    select each of sensor node forward stations as a cluster central-head; and
    classify said wireless UWB-based space-time sensor nodes into each of cluster groups.

20. The article of claim 19 further storing programmable instructions that cause a processor-based system to select the wireless UWB-based space-time sensor nodes into said each of cluster groups based on signal strength.

21. The article of claim 19 further storing programmable instructions that cause a processor-based system to allow said each of sensor node forward stations broadcasts to all of the wireless UWB-based space-time sensor nodes within said each of cluster groups.

22. The article of claim 19 further storing programmable instructions that cause a processor-based system to allow said each of the wireless UWB-based space-time sensor nodes to send a response signal, sensor ID code, and sensing data to said each of sensor node forward stations within said each of cluster groups.

23. The article of claim 19 further storing programmable instructions that cause a processor-based system to start transmitting data from said each of sensor node forward stations within said each of cluster groups to a sensor basestation.

* * * * *